(12) United States Patent
Brumfield et al.

(10) Patent No.: US 8,032,432 B2
(45) Date of Patent: *Oct. 4, 2011

(54) SYSTEM AND METHOD FOR TRACKING A BILLING CYCLE

(75) Inventors: Pam Brumfield, Plano, TX (US);
George W. Harper, Garland, TX (US);
Christina Reed, Dallas, TX (US);
Daniel Coleman, Dallas, TX (US); Alec Bell, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/581,016

(22) Filed: Oct. 16, 2009

(65) Prior Publication Data
US 2010/0036762 A1 Feb. 11, 2010

Related U.S. Application Data

(63) Continuation of application No. 10/693,311, filed on Oct. 24, 2003, now Pat. No. 7,606,745.

(60) Provisional application No. 60/421,429, filed on Oct. 25, 2002.

(51) Int. Cl.
*G07F 19/00* (2006.01)
*H04M 15/00* (2006.01)

(52) U.S. Cl. ............ 705/34; 705/37; 705/412; 379/111; 379/127.06; 455/408

(58) Field of Classification Search .................. None
See application file for complete search history.

(56) References Cited

OTHER PUBLICATIONS

U.S. Appl. No. 10/693,311, filed Oct. 24, 2003, Brumfield et al.

*Primary Examiner* — Luna Champagne
(74) *Attorney, Agent, or Firm* — Parks IP Law LLC; Mickki D. Murray, Esq.

(57) ABSTRACT

A system for tracking a billing cycle in a billing system includes a data tracking engine and a rule-based engine. The rule-based engine retrieves information from the billing system during the billing cycle based on a set of rules, and provides the data to the data tracking engine. The data tracking engine generates status information and reports based on the data. The status information and reports can be accessed via a web client to monitor the billing cycle. Additionally, the rule-based engine identifies events in the billing cycle and generates a notification to alert a person if the event is not successfully completed according to a billing schedule. The notification can be accessed via a web client or a wireless communications device. The rule-based engine can subsequently issue an escalated notification to alert another user if the event has not successfully completed at a later time.

20 Claims, 6 Drawing Sheets

SYSTEM AND METHOD FOR TRACKING A BILLING CYCLE

CROSS-REFERENCE TO RELATED APPLICATIONS

This application is a continuation of U.S. application Ser. No. 10/693,311, filed Oct. 24, 2003 now U.S. Pat. No. 7,606, 745 which claims priority to U.S. Provisional Application No. 60/421,429, filed Oct. 25, 2002, both of which are incorporated herein by reference.

FIELD OF THE INVENTION

The present invention relates generally to billing systems, and more particularly to a system and method for tracking a billing cycle executing on a billing system and data associated with the billing cycle.

BACKGROUND

In a typical system, various billing processes are executed to generate billing statements. The billing processes range from collecting billing information to printing billing statements. The collection of billing processes and data associated therewith constitutes a billing cycle that is executed on the billing system.

The billing processes in a billing cycle are often interrelated and interdependent. As a result, one billing process may be prevented from starting until another billing process has completed. Consequently, a delay in the completion of one billing process may cause a chain reaction of delays in other billing processes, which may ultimately delay the completion of the billing cycle. Because of the potential impact on the billing cycle, the billing processes are typically monitored to identify problems that could delay the completion of the billing processes.

The monitoring of billing processes in a billing cycle is often subjective and can results in misidentification of problems in the billing processes. Additionally, the problems identified in the billing processes are not always effectively communicated in a timely manner to the managers of the billing processes. Furthermore, the monitoring of billing processes in existing systems is often performed on an ad hoc, piecemeal basis, which may entail gathering necessary data from several sources, both internal and external to the billing enterprise. Accordingly, there exists a need to accurately identify problems in the billing processes in a billing cycle and to effectively communicate the problems to managers of the billing processes in a timely manner.

SUMMARY

The present invention addresses the need for accurately identifying problems that can delay billing processes in a billing cycle and effectively communicating the problems in a timely manner to the managers of the billing processes. In embodiments of the present invention, a data tracking and notification system tracks events for billing processes in a billing cycle and issues a notification to alert a person if one or more values of an event reaches or exceeds a threshold that could result in a delay of a billing process. The person receiving the notification can then intervene in the billing process to resolve issues related to the event. The data tracking and notification system can subsequently issue an escalated notification to alter another user if one or more values of the event reach another threshold because the issues related to the event have not been resolved.

The data tracking and notification system includes a data tracking engine and a rule-based engine. The rule-based engine executes a set of rules to retrieve billing data generated by a computerized billing system during a billing cycle and to provide the billing data to the data tracking engine. The data tracking engine stores the billing data and processes the billing data to create status information and reports for the billing cycle. The billing data, status information and reports in the data tracking engine can then be accessed via a web client to monitor the billing cycle.

By executing the rule set, the rule-based engine also identifies events in the billing cycle, determines a threshold for each event, and determines actual values for the events. The rule-based engine further evaluates the thresholds of the events based on the actual values to identify events that have exceeded their thresholds and, thus could delay dependent events in the billing cycle. If the rule-based engine identifies an event that has exceeded its threshold, the rule-based engine issues a notification to alert a person. The rule-based engine then updates the actual value of the event in the data tracking engine and evaluates the threshold of the event based on the updated actual value. If the event still exceeds the threshold, the rule-based engine issues an escalated notification to alert another person.

A method in accordance with an embodiment of the present invention includes a step of retrieving a billing schedule that specifies billing cycle events for a billing cycle in a computerized billing system. A billing cycle event is identified from the billing schedule and a rule set is accessed. The rule set defines prespecified rules for computing an expected value for the billing cycle event. Additionally, the rule set defines prespecified rules for determining an actual value for the billing cycle event from information generated by the computerized billing system. The rule set is executed to compute the expected value and to determine the actual value for the billing cycle event. Additionally, a web page containing indicia representative of the expected value and the actual value for the billing cycle event can be created in response to a web page request.

A notification is issued if the actual value for the event exceeds a predetermined threshold. The actual value can then be updated and an escalated notification can be issued if the updated actual value exceeds another predetermined threshold.

A system in accordance with an embodiment of the present invention includes a data tracking engine and a rule-based engine. The data tracking engine obtains a billing schedule that specifies billing cycle events for a billing cycle in a billing system. The rule-based engine identifies a billing cycle event and accesses a rule set corresponding to the billing cycle event. The rule-based engine executes the rule set to compute an expected value for the billing cycle event and determine an actual value for the billing cycle event. The system can then create a web page containing indicia representative of the expected value and the actual value.

The system can issue a notification if the actual value for the first billing cycle event exceeds a predetermined threshold. The rule-based engine can subsequently determine an updated actual value for the billing cycle event and issue an escalated notification if the updated actual value exceeds another predetermined threshold.

DETAILED DESCRIPTION OF THE PREFERRED EMBODIMENT

The present invention provides systems and methods for tracking events in a billing cycle. The events have one or more thresholds that can be evaluated to determine the status of the event. Thresholds represent values or conditions that could cause the billing process and the billing cycle to be delayed. In the present invention, the events are tracked by evaluating the thresholds during the billing cycle and issue notifications to alert users when the thresholds of the events are exceeded. Additionally, the system tracks billing data for the billing cycle by retrieving the billing data from the billing system and generating status information and reports based on the billing data. The billing information, status information and reports can be accessed via a web browser on a web client to monitor the billing cycle.

Figure 1:
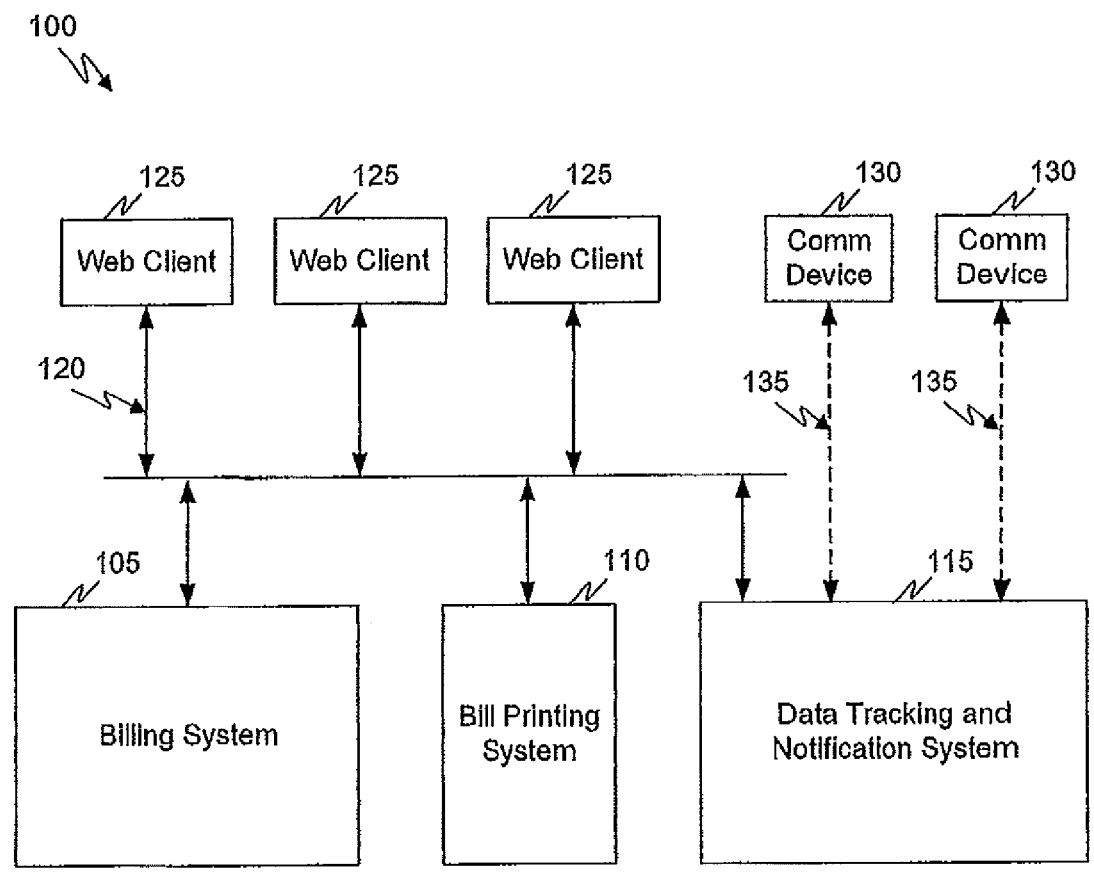
FIG. 1 is a block diagram of a networked computer system in which an embodiment of the invention is implemented.

A computerized environment 100 implementing an embodiment of the present invention is shown in FIG. 1. The environment 100 includes a billing system 105, a bill printing system 110 and a data tracking and notification system 115 that each communicate via a computing network 120 with other devices or systems linked to the network 120 via the computing network 120. The computing network 120 can include any one or combination of private and public networks known in the art. The billing system 105 is a computerized system that executes billing processes in a billing cycle to prepare billing statements. The bill printing system 110 prints out the billing statements. The data tracking and notification system 115 communicates with the billing system 105, and the bill printing system 110, the web clients 125, and the communication devices 130 to obtain data for the billing cycle. Additionally, the data tracking and notification system 115 tracks data and events for the billing cycle and issues notifications for the events, as is explained more fully herein.

The environment 100 includes one or more web clients 125 that communicate with the computing network 120. The web clients 125 allow a user to enter a billing schedule for the billing cycle into the data tracking and notification system 115 through an appropriate interface, such as a web page, as is explained more fully herein. Additionally, the web clients 125 allow a user to access and monitor the data in the data tracking and notification system 115, as is explained more fully herein. It is to be understood that the web clients 125 shown in FIG. 1 are exemplary and that the environment 100 can have any number of web clients 125.

The environment 100 may include one or more communications devices 130 that communicate with the data tracking and notification system 115 via a communications link 135. For example, a communications device 130 can be a pager or a mobile computing device, and the communications link 135 can be a wireless communications link implemented via the PSTN or other suitable existing network. The data tracking and notification system 115 issues notifications for events in a billing cycle to the web clients 125 and the communications devices 130, as is explained more fully herein. It is to be understood that the communications devices 130 shown in FIG. 1 are exemplary and that the environment 100 can have any number of communications devices 130.

Figure 2:
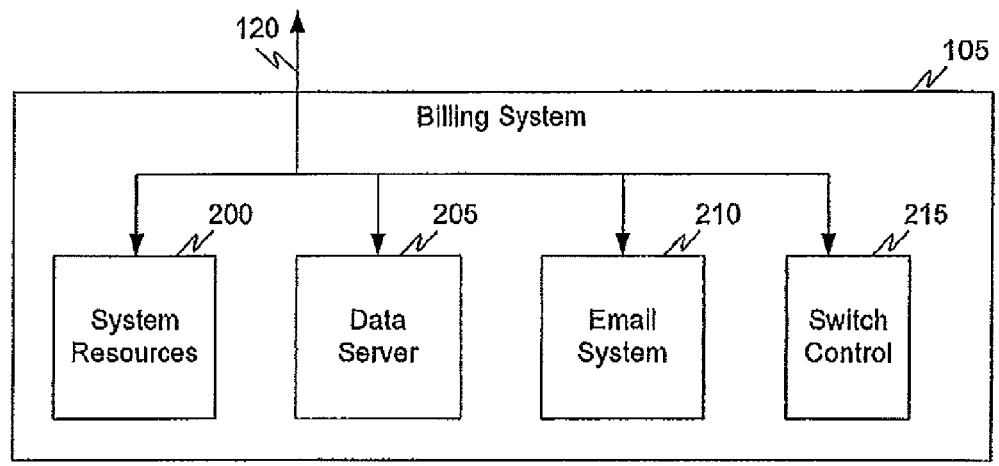
FIG. 2 is a block diagram of an exemplary billing system shown in FIG. 1, in accordance with an embodiment of the present invention.

Referring now to FIG. 2, an exemplary billing system 105 is shown. The exemplary billing system 105 includes system resources 200 that communicate with the computing network 120. The system resources 200 include electronic systems and devices for processing a billing cycle on the billing system 105. The system resources 200 can include computing systems, file servers and data storage networks. For example, the system resources 200 can include a computing system executing UNIX operating system. Additionally, the exemplary billing system 105 can include one or more data servers 205 that communicate with the computing network 120. Each data server 205 includes one or more databases that can store data for the billing system 105. For example, the data server 210 can be a computing server executing the UNIX operation system and the database can be an ORACLE database.

The exemplary billing system 105 includes an email system 210 that communicates with the computing network 120. The email system 210 is capable of receiving and storing email messages from the computing network 120 and sending email messages to the computing network 120. In one embodiment, the email system 210 can communicate with the Internet to send and receive email messages via the Internet.

The exemplary billing system 105 further includes a switch control 215 in a wireless communications system. The switch control 215 is configured to monitor switch operation and send and receive messages to and from the switches to implement functions such as requesting an update in the switches (e.g., activation of a telephone number) and requesting status information for the switches.

Figure 3:
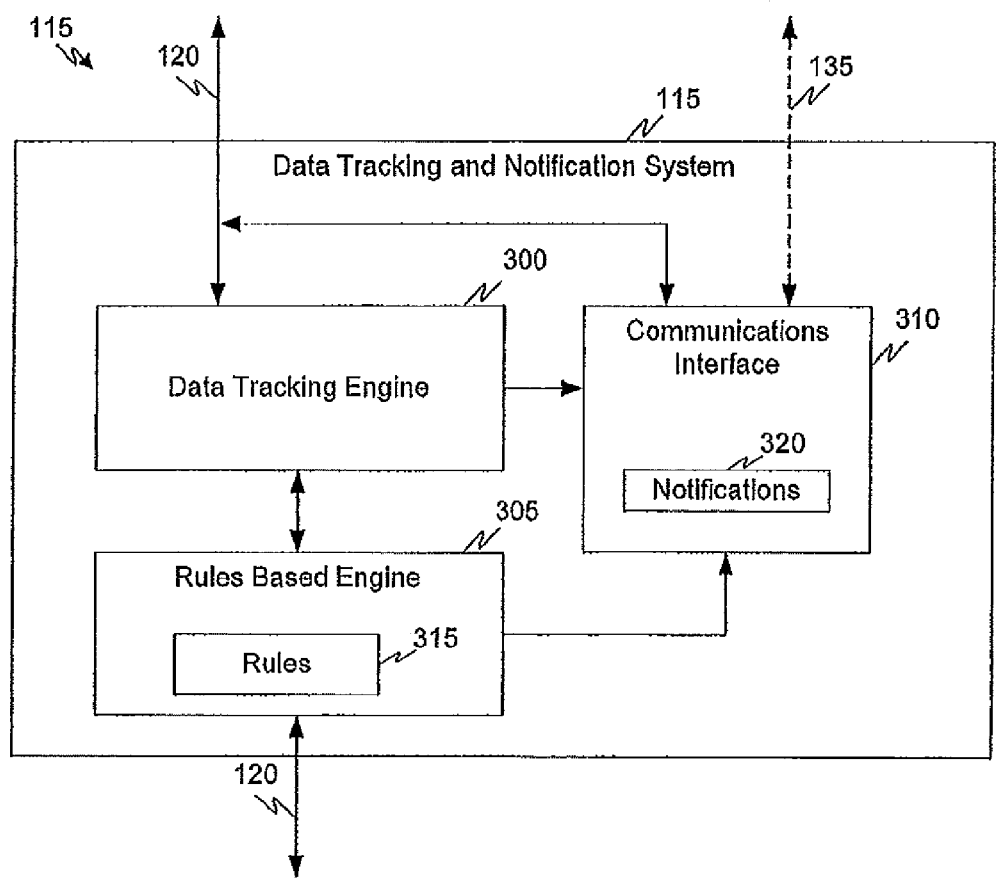
FIG. 3 is a block diagram of the data tracking and notification system shown in FIG. 1, in accordance with an embodiment of the present invention.

Referring now to FIG. 3, the data tracking and notification system 115 includes a data tracking engine 300, a rule-based engine 305 and a communications interface 310. The data tracking engine 300 communicates with the computing network 120 and the rule-based engine 305. Additionally, the rule-based engine 305 communicates with the computing network 120 and the communications interface 310. The communications interface 310 communicates with the bill printing system 110 and the computing clients 125 via the computing network 120 and with the communications devices 130 of FIG. 1 through the communications link 135.

The data tracking engine 300 receives data from the rule-based engine 305 and tracks the data, as is described more fully herein. Additionally, the data tracking engine 300 receives data from the web clients 125 of FIG. 1 and provides data to the web clients 125, as is described more fully herein.

The rule-based engine 305 includes a set of rules 315 for controlling the operation of the rule-based engine 305. The set of rules 315 defines the functionality of the rule-based engine 305, which can include retrieving data from the billing system 105 and the data tracking engine 300, and executing computing processes in the billing system 105, data tracking engine 300, and communications interface 310. For example, the rule set 315 can identify the location of data required to compute event values, specify procedures for retrieving the data, specify mathematical or logical equations for calculating the events values, and prescribe actions to be taken if events values exceed thresholds. The rule-based engine 305 can be an expert system known in the art, such as NetExpert sold by Agilent Technologies.

The rule-based engine 305 executes the set of rules 315 to retrieve data from the billing system 105, provide the data tracking engine 300, and issue notifications 320 to the communications interface 310, as is explained more fully herein. For example, the rule-based engine 305 can periodically execute the set of rules 315 to cause a computing process (e.g., a UNIX script) to obtain status information from the system resources 200 (e.g., file systems are full). As another example, the rule-based engine 305 can execute the rules 215 to cause a computing process (e.g., an SQL query or a TCK/TL script) to extract billing process information from the data servers 205 (e.g., the number of billing errors outstanding in the billing cycle). Additionally, the rule-based engine 305 can execute the set of rules 315 to retrieve email messages for billing operation requests (e.g., correct customer billing information) from the email system 210 and cause a computing process (e.g., a JAVA script or PERL script) to extract the billing operation request from the email message. Further, the rule-based engine 305 can obtain status information for the network switches in the switch control 215, as is explained more fully herein.

The communications interface 310 receives notifications 320 (e.g., email messages and paging messages) from the rule-based engine 305 and the data tracking engine 300, and transmits the notifications 320 to the communications devices 130 via the communications link 135. For example, the communications interface 310 can be an electronic interface to a public telephone system that accepts messages for routing to a paging device or a mobile computing device. Additionally, the communications interface 310 can send the notifications (e.g., email messages) to the web clients 125 via computing network 120. Further, the communications interface 310 can receive data from the bill printing system 110 (e.g., email messages containing bill printing information) and provide the data to the data tracking engine 300 and rule-based engine 305.

Figure 4:
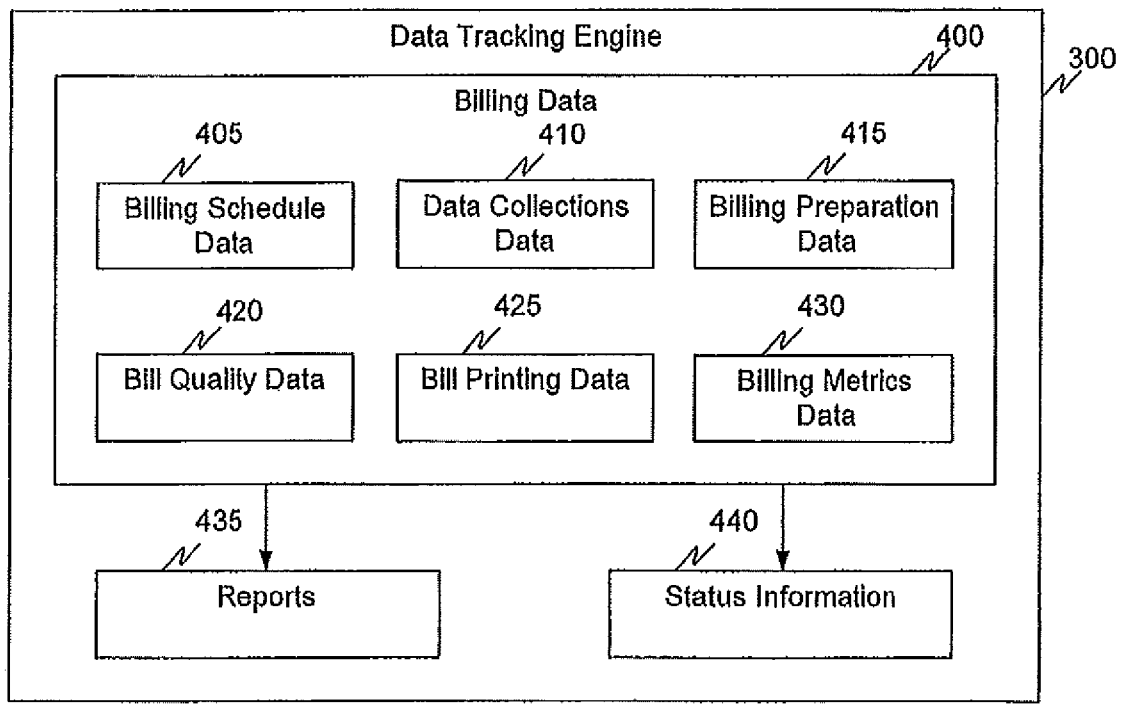
FIG. 4 is a block diagram of an exemplary data tracking engine shown in FIG. 3, in accordance with an embodiment of the present invention.

Referring now to FIG. 4, an exemplary data tracking engine 300 is shown. The data tracking engine 300 receives billing data 400 from the web clients 125 and the rule-based engine 305, and stores the billing data 400, as is described more fully herein. The billing data 400 includes billing schedule data 405 obtained by the web clients 125, the data tracking engine 300 and the rule-based engine 305, as is explained more fully herein. Additionally, the billing data 400 includes data received from the rule-based engine 305 for billing processes executing on the system resources 200 of the billing system 105. For example, the billing data 400 can include data collections data 410 from a data collections process (e.g., collection of customer information), billing preparation data 415 from a billing preparation process (e.g., preparation of customer bills), and bill quality data 420 from a bill quality control process. Additionally, the billing data 400 can include bill printing data 425 received from the rule-based engine 305 for a bill printing process in the bill printing system 110. The billing data 400 can also include a billing metrics data 430 from a billing metrics process (e.g., computation of metries for a billing cycle) in the billing system 105.

The data tracking engine 300 can generate reports 435 and status information 40 based on the billing data 410. Additionally, the data tracking engine 300 can issue notifications 320 to the communications interface 310 for the web clients 125 and the communications devices 130, as is explained more fully herein.

Figure 5:
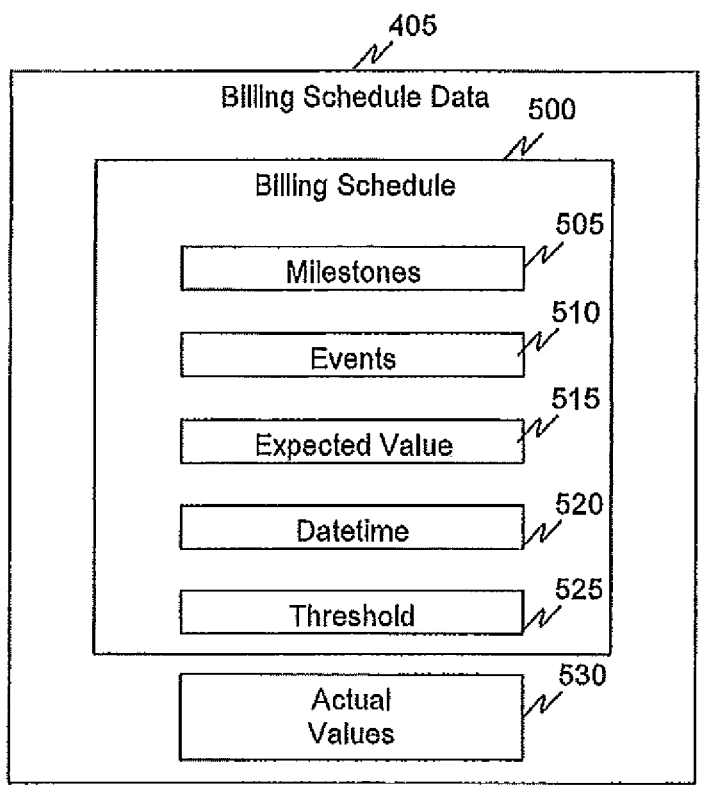
FIG. 5 is a block diagram of exemplary billing schedule data shown in FIG. 4, in accordance with an embodiment of the present invention.
Figure 6:
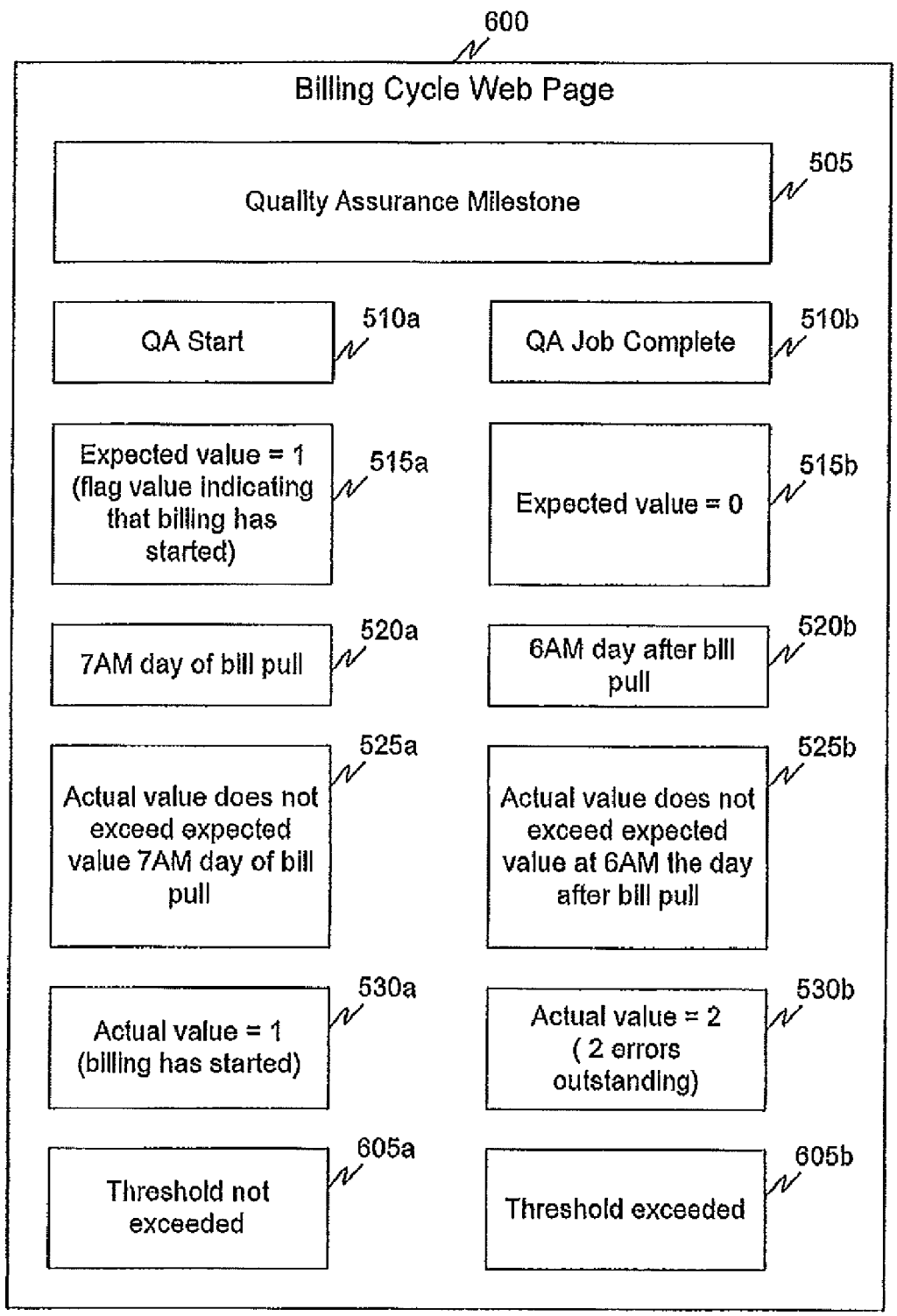
FIG. 6 is a block diagram of an exemplary billing cycle web page, in accordance with an embodiment of the present invention.

Referring now to FIG. 5, more details of the billing schedule data 405 are shown. The billing schedule data 405 include a billing schedule 500. The billing schedule 500 includes milestones 505 for billing processes to be completed in the billing cycle. For example, the billing schedule 500 can include a quality assurance milestone 505 for a quality assurance process. The billing schedule 500 also includes a collection of events 510 that are to occur for each milestone 505 in the billing cycle. Each event 510 has an expected value 515 and a datetime 520. The expected value 515 specifies a desired value for the event 510 and the datatime 520 specifies a date and time at which the event is to have the expected value 515. Each event 510 further includes a threshold 525 for each event 510, as is explained more fully herein.

The billing schedule data 405 includes an actual value 530 for each event 510 that indicates the status of the event 510 in the billing cycle. The rule-based engine 305 executes the rules 135 to retrieve the actual values of the events 510 from the billing system 105 or the web clients 125, and to provide the actual values 530 to the data tracking engine 300, as is explained more fully herein. The data tracking engine 300 receives the actual values 530 and stores the actual values 530 in the billing schedule data 405.

The threshold 525 of an event 510 is based on the expected value 515, datetime 520 and actual value 530 of the event 510. The rule-based engine 305 evaluates the threshold 530 of the event 510 to determine if the event 510 has successfully completed according to the billing schedule 500, as is described more fully herein. For example, an event 510 in a quality assurance milestone 505 can be the completion of a quality assurance process, the expected value 515 of the event 510 can be zero, the actual value 530 of the event 510 can be the number of errors outstanding in the quality assurance process, and the datetime 520 of the event 510 can be 6 AM the day after a bill pull. In this example, the threshold 530 is the condition that the number of errors outstanding in the quality assurance process is equal to zero 6 AM the day after the bill pull and the threshold 530 is exceeded if this condition is not met.

The rule-based engine 305 executes the rules 215 to evaluate the threshold 525 of each event 510 and issue a notification 320 if the threshold 525 of the event 510 is exceeded (e.g., the event 510 has not successfully completed at the datetime 520). In one embodiment, the rule based engine 305 issues the notification 320 to alert a predetermined person or group of persons responsible for the billing process related to the event 510. The person or group of persons can then take steps to cause the event 510 to complete successfully. After issues the notification 320, the rule-based engine 305 executes the set of rules 315 to update the billing data 400 in the data tracking engine 300 and access the updated billing data 400 to obtain the updated actual value 520 of the event 510. Additionally, the rule-based engine 305 executes the set of rules 315 to update the datetime 520 and threshold 525 for the event 510. The rule-based engine 305 then executes the set of rules 315 to evaluate the updated threshold 525 and to issue an escalated notification 320 if the threshold 525 of the event 510 is exceeded. In one embodiment, the rule-based engine 305 issues an escalated notification 320 to alert a predetermined person (e.g., a manager or supervisor) responsible for the billing process related to the event 510. The person receiving the notification can then take steps to cause the successful completion of the event 510 or to override the event (i.e., disabled the event in the billing schedule).

In one embodiment, a person provides parameters for a billing cycle (e.g., a completion date for the billing cycle) to the data tracking engine 300 through an interface (such as a web page interface) running on a web client 125. The rule-based engine 305 then executes the set of rules 315 to create the events 510 for each milestone 505, and determine the expected values 515, datetimes 520 and thresholds 525 for the events 510. In another embodiment, a person provides parameters for a billing cycle to the data tracking engine 300 and the rule-based engine 305 executes the set of rules 315 to create the expected values 515, datetimes 520 and threshold 525 for the events 510 based on the parameters. It is to be understood that the milestones 505 and events 510 are not limited to a particular billing system 105 and that the present invention can have different milestones 505 and events 510 for different billing systems 105.

In one embodiment, the rule-based engine 305 executes the set of rules 315 to retrieve the actual values 530 for the events 510 from the billing system 105. The rule-based engine 305 then executes the set of rules 315 to identify events 510 in the billing schedule 500 and evaluate the events 510 based on the actual values 530 retrieved from the billing system 105. In this embodiment, the rule-based engine 305 can store the actual values 530 in the rule-based engine 305. Additionally, the rule based engine 305 can execute the set of rules 315 to provide the actual values 305 to the data tracking engine 300, and the data tracking engine 300 can store the actual values 305 in the billing schedule data 405.

Referring now to FIG. 1, an exemplary billing cycle web page 600 is shown. For example, the billing cycle web page 600 can be a document that can be displayed in a window of an Internet browser. In one embodiment, the data tracking engine 300 creates a billing cycle web page 600 and a web client 125 accesses the billing cycle web page 600 in the data tracking engine 300 and displays the billing cycle web page 600. In another embodiment, the data tracking engine 300 creates a billing cycle web page 600 for displaying notifications 320 issued to the communications interface 310 from the data tracking engine 300 or the rule-based engine 305.

The exemplary billing cycle web page 600 includes a representation of a milestone 505 in the billing cycle and a representation of events 510 in the milestone 505. Additionally, the billing cycle web page 600 can include a representation of the expected values 515, datetimes 520, thresholds 515 and actual values 530 for the events 510 represented in the billing cycle web page 600. Additionally, each event 510 represented in the billing cycle web page 600 can include one or more indicators 605 to indicate the status of the event 510. For example, the indicator can indicate whether the threshold 525 is exceeded for the event 510 by, for example, displaying a red or green light.

Figure 7:
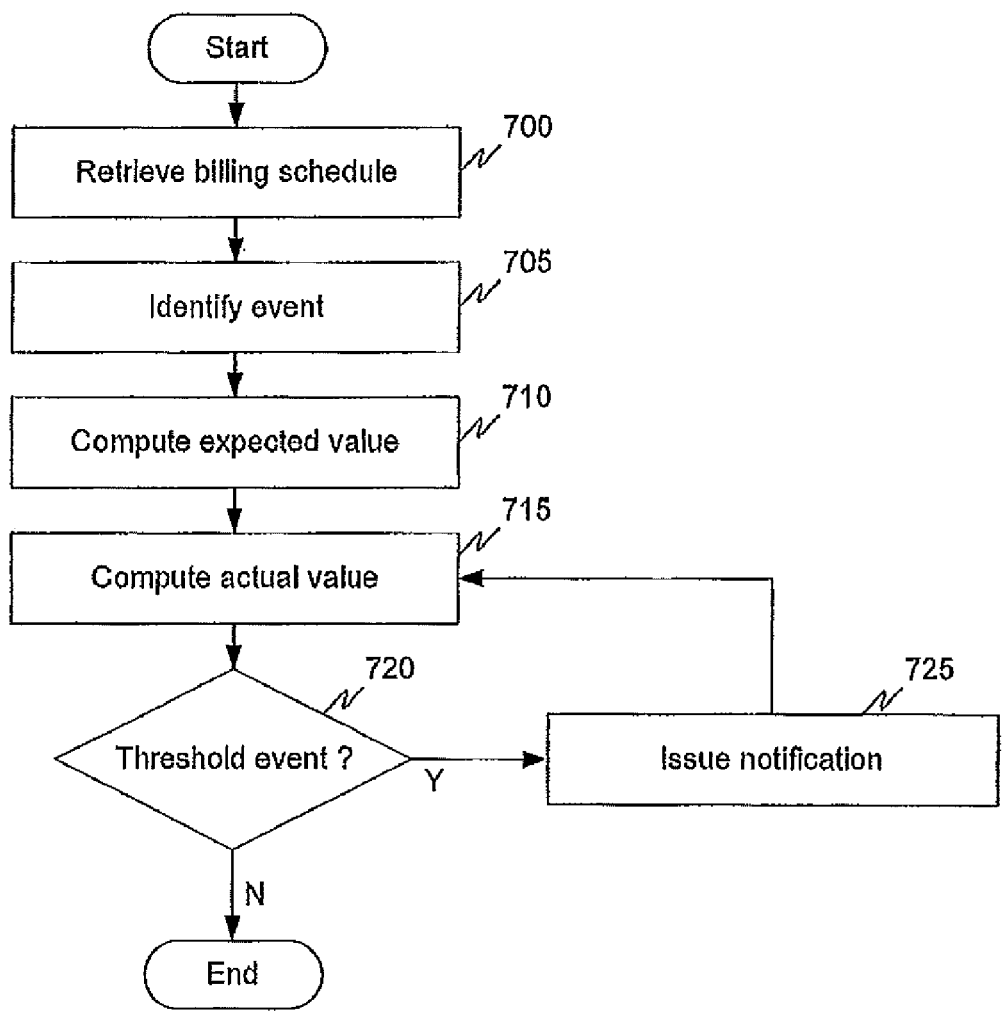
FIG. 7 is a flow chart of a method for tracking the events shown in FIG. 5, in accordance with an embodiment of the present invention.

Referring now to FIG. 7, a method for tracking data in a billing cycle is shown. In step 700, the data tracking engine 300 retrieves a billing schedule 500 for a billing cycle in the billing system 105, as is described more fully herein. In one embodiment, a person enters parameters (e.g., date of the bill pull) for the billing schedule 500 into the data tracking engine 300 via the web client 125. In this embodiment, the rule-based engine 305 creates milestones 505, events 510 and datetimes 520 in the billing schedule 500, based on the parameters. In another embodiment, the milestones 505 and events 510 are predetermined.

In step 705, the rule-based engine 305 identifies an event 510 in the billing schedule 500 for processing. In one embodiment, the rule-based engine 305 executes the set of rules 315 to obtain the actual date and time (e.g., current date and time) from the billing system 105 or the data tracking engine 300, and to compare the actual date and time to the datetime 520 of the event 510. In this embodiment, the event 510 is identified if the actual date and time matches the datetime 520 of the event 510.

In step 710, the rule-based engine 305 accesses a set of rules 315, which define prespecified rules for computing the expected value for the event 510, and executes the set of rules 315 to compute the expected value 515 for the event 510. Additionally, the set of rules 315 can define prespecified rules for computing the datetime 520 and threshold 525 for the event 510, and the rule-based engine 305 can execute the set of rules 315 to compute the datetime 520 and threshold 525 of the event 510. In one embodiment, a person enters parameters (e.g., date of the bill pull) for the billing schedule 500 into the data tracking engine 300 via the web client 125. In this embodiment, the rule-based engine 305 executes the set of rules 315 to compute the datetime 520 and threshold 525 of the event 510 based on the parameter.

In step 715, the rule-based engine 305 accesses the set of rules 315, which define prespecified rules for computing an actual value 525 for the event 510, and executes the set of rules 315 to compute actual value 525 for the event 510. In one embodiment, the rule-based engine 305 executes the set of rules 315 to retrieve billing data 400 from the billing system 105 and to store the billing data 400 in the data tracking engine 300. The rule-based engine 305 then executes the set of rules 315 to access the billing data 400 in the data tracking engine 300 and to determine the actual value 535 for the event 510 base on the billing data 400. In another embodiment, the rule-based engine 305 executes the set of rules 315 to retrieve data from the billing system 105 or the data tracking engine 300 and to determine the actual value for the event 510 based on the data retrieved.

In step 720, the rule-based engine 305 evaluates the threshold 525 for the event 510 to determine if the threshold 525 is exceeded. In one embodiment, the rule-based engine 305 executes the set of rules 315 compares the expected value 515 of the event 510 to the actual value 530 of the event 510 at the datetime 520 of the event 510 to evaluate the threshold 525 of the event 510. If the threshold 525 is exceeded, the method proceeds to step 725, otherwise the method ends.

In step 725, the rule-based engine 305 executes the set of rules 315 to issue a notification 320 for the event 510 to the communications interface 310. For example, the notification 320 can be an email message or a paging message. The communications interface 310 receives the notification 320 and transmits the notification to a web client 125 via the computing network or a communications device 130 via the communications link 135, or both. The method then proceeds to step 715.

In one embodiment, the rule-based engine 305 executes the set of rules 315 to issue an escalated notification 320 to the communications interface 310 for each subsequent execution of step 725. The communications interface 310 receives the escalated notification 320 and transmits the escalated notification 320 to another web client 125 or communications device, or both.

Figure 8:
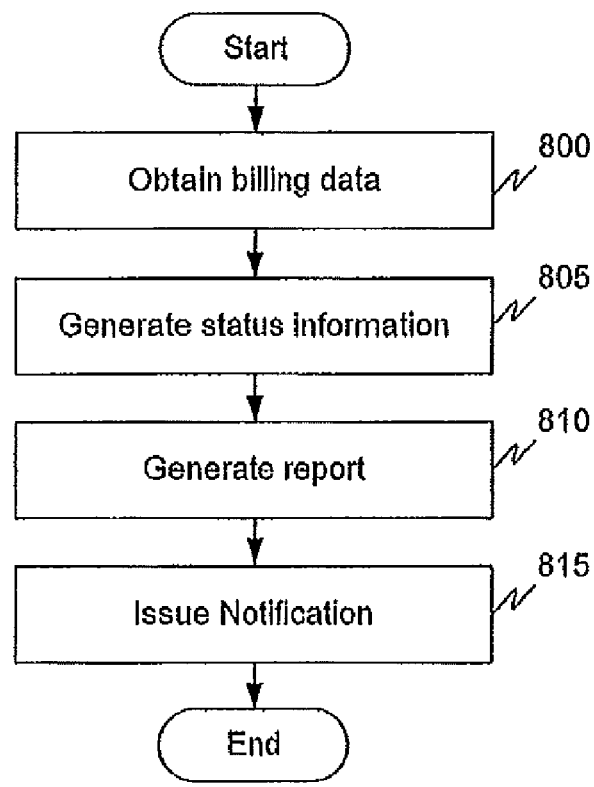
FIG. 8 is a flow chart for generating the status information and reports shown in FIG. 4, in accordance with an embodiment of the present invention.

Referring now to FIG. 8, a method for generating the reports 435 and status information 440 is shown. In step 800, the data tracking engine 300 obtains billing data 400. In this process, the rule-based engine 305 executes the set of rule 315 to retrieve the billing data 400 from the billing system 105 and to provide the billing data 400 to the data tracking engine 300. The data tracking engine 300 receives the billing data 400 from the rule-based engine 305 and stores the billing data 400. In one embodiment, the data tracking engine 300 also obtains billing data 400 via the web client 125. In this embodiment, a person enters the billing data 400 into the data tracking engine 300 via a web client 125.

In step 805, the data tracking engine 300 accesses the billing data 400 and generates reports 435 for the billing processes in the billing cycle based on the billing data 400. In one embodiment, the reports 435 can be accessed via a web client 125. For example, the data tracking engine 300 can create a web page containing a report 435 and can provide the web page to the web client 125 in response to a request for the report 435. In another embodiment, the data tracking engine 300 sends the reports 435 to the web clients 125 when the reports 435 are complete or at another predetermined time. In this embodiment, reports 435 can be accessed directly from the web client 125.

In step 810, the data tracking engine 300 accesses the billing data 400 and generates status information 440 based on the billing data 400. In one embodiment, the status information 440 can be accessed via a web client 125 to monitor the billing processes in the billing cycle. For example, the data tracking engine 300 can create a web page containing the status information 440 and can provide the web page to the web client 125 in response to a request for the status information 435. In another embodiment, the data tracking engine 300 send the status information 440 to the web client 125. In this embodiment, the web client 125 displays the status information 440 and a person can access the status information 440 directly from the web client 125.

In step 815, the data tracking engine 300 accesses the billing data 400 and issues a notification 320 to the communications interface 310 based on the billing data 400. The communications interface receives the notification 320 (e.g., email message or paging message) from the data tracking engine 300 and transmits the notification 320 to a web client 125 or a communications device 130, as is described more fully herein. In one embodiment, the data tracking engine 300 creates a billing cycle web page 600 for displaying the notification 320, as is explained more fully herein.

The present invention has been described herein with reference to one or more particular embodiments that are illustrative of the present invention. Those skilled in the art will appreciate modifications, adaptations, or variations of the embodiments described herein that fall within the scope of the invention. As a result, the invention is not limited to the specific examples and illustrations discussed herein, but only by the following claims and their equivalents.

What is claimed is:

1. A method for tracking a plurality of billing cycle events in a given billing cycle, the method comprising:
   a tangible data tracking and notification system executing computer-readable code to process a bill according to a billing schedule defined for a billing cycle, the code being executed to perform acts comprising:
   identifying one of a plurality of billing cycle events set to occur before reaching a milestone during the billing cycle as provided by the billing schedule, wherein:
      the milestone marks completion of a billing process for which the plurality of billing cycle events are defined; and
      the billing cycle event has an expected value and a time value associated therewith: the expected value specifying a desired value for the billing cycle event and the time value specifying a time at which the billing cycle event is to have the expected value;
   determining an actual value for the billing cycle event;
   comparing the expected value to the actual value at the time specified in the time value to determine whether the expected value has been reached;
   if the expected value has been reached, marking successful completion of the billing cycle event; and
   if the expected value has not been reached, issuing a notification to alert a predetermined entity that the expected value has not been reached.

2. The method of claim 1, further comprising receiving the billing schedule, including definitions for the plurality of billing cycle events and the milestone, from a web client in communication with the data tracking and notification system via a computing network.

3. The method of claim 2, wherein receiving the billing schedule, including definitions for the plurality of billing cycle events and the milestone, from the web client comprises receiving the billing schedule as input by a user of the web client.

4. The method of claim 1, further comprising receiving the billing schedule, including definitions for the plurality of billing cycle events and the milestone, from a billing system in communication with the data tracking and notification system via a computing network.

5. The method of claim 1, wherein issuing the notification to alert the predetermined entity that the expected value has not been reached comprises sending the notification to a web client in communication with the data tracking and notification system via a computing network.

6. The method of claim 1, wherein issuing the notification to alert the predetermined entity that the expected value has not been reached comprises sending the notification to a communications device in communication with the data tracking and notification system via a communications link.

7. The method of claim 1, further comprising creating a web page containing indicia representative of the expected value and the actual value for the billing cycle event.

8. The method of claim 7, further comprising creating the web page containing indicia representative of the notification.

9. The method of claim 1, further comprising issuing an escalated notification to alert the predetermined entity that the expected value has not been reached.

10. A data tracking and notification system for tracking a plurality of billing cycle events in a given billing cycle, the data tracking and notification system comprising:
    a tangible rule-based engine configured to execute computer-readable code in order to at least:
    identify one of a plurality of billing cycle events set to occur before reaching a milestone during the billing cycle as provided by the billing schedule, wherein:
       the milestone marks completion of a billing process for which the plurality of billing cycle events are defined; and
       the billing cycle event has an expected value and a time value associated therewith: the expected value specifying a desired value for the billing cycle event and the time value specifying a time at which the billing cycle event is to have the expected value;
    determine an actual value for the billing cycle event;
    compare the expected value to the actual value at the time specified in the time value to determine whether the expected value has been reached;
    if the expected value has been reached, mark successful completion of the billing cycle event; and
    if the expected value has not been reached, issue a notification to alert a predetermined entity that the expected value has not been reached.

11. The data tracking and notification system of claim 10, wherein the rule-based engine is further configured to:
    issue an escalated notification to alert the predetermined entity that the expected value has not been reached.

12. The data tracking and notification system of claim 10, wherein the rule-based engine is further configured to receive the billing schedule, including definitions for the plurality of billing cycle events and the milestone, from a web client in communication with the data tracking and notification system via a computing network.

13. The data tracking and notification system of claim 12, wherein the rule-based engine being configured to receive the billing schedule, including definitions for the plurality of billing cycle events and the milestone, from the web client comprises receiving the billing schedule as input by a user of the web client.

14. The data tracking and notification system of claim 10, wherein the rule-based engine is further configured to receive the billing schedule, including definitions for the plurality of billing cycle events and the milestone, from a billing system in communication with the data tracking and notification system via a computing network.

15. The data tracking and notification system of claim 10, wherein the rule-based engine being configured to issue the notification to alert the predetermined entity that the expected value has not been reached comprises the rule-based engine being configured to send the notification to a web client in communication with the data tracking and notification system via a computing network, whereby the predetermined entity has access to the notification by way of the web client.

16. The data tracking and notification system of claim 10, wherein the rule-based engine being configured to issue the notification to alert the predetermined entity that the expected value has not been reached comprises the rule-based engine being configured to send the notification to a communications device in communication with the data tracking and notification system via a communications link, whereby the predetermined entity has access to the notification by way of the communications device.

17. The data tracking and notification system of claim 16, wherein the rule-based engine is further configured to receive an input from the communications device, the input specifying a corrective action to successfully complete the billing cycle event.

18. The data tracking and notification system of claim 17, wherein the rule-based engine is further configured to receive the input specifying a request to disable the billing cycle event in the billing schedule as the corrective action.

19. The data tracking and notification system of claim 10, configured to create a web page containing indicia representative of the expected value and the actual value for the billing cycle event.

20. A tangible computer program product for tracking a plurality, of billing cycle events in a given billing cycle, the tangible computer program product comprising computer-executable code executable by a processor to perform acts comprising:
identifying one of a plurality of billing cycle events set to occur before reaching a milestone during the billing cycle as provided by the billing schedule, wherein:
the milestone marks completion of a billing process for which the plurality of billing cycle events are defined; and
the billing cycle event has an expected value and a time value associated therewith: the expected value specifying a desired value for the billing cycle event and the time value specifying a time at which the billing cycle event is to have the expected value;
determining an actual value for the billing cycle event;
comparing the expected value to the actual value at the time specified in the time value to determine whether the expected value has been reached;
if the expected value has been reached, marking successful completion of the billing cycle event; and
if the expected value has not been reached, issuing a notification to alert a predetermined entity that the expected value has not been reached.

* * * * *